(No Model.)
H. LEMP.
ART OF ELECTRIC WELDING.
No. 458,176. Patented Aug. 25, 1891.
Fig. 1.
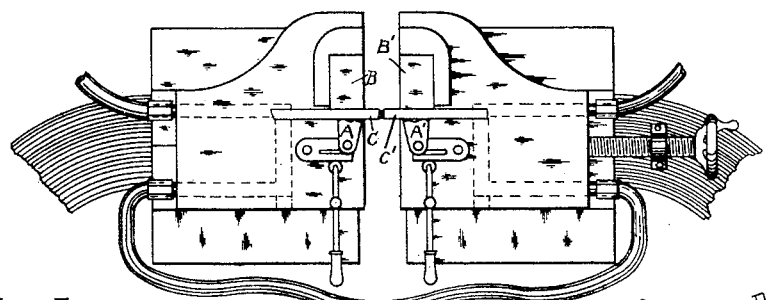
Fig. 2.
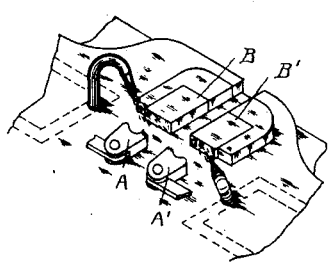
Fig. 3.
Fig. 4.
Fig. 5.
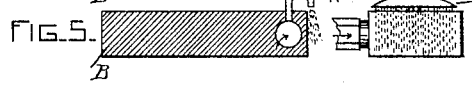
Fig. 8.
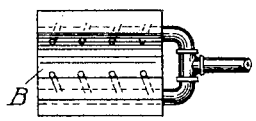
Fig. 6.
Fig. 7.
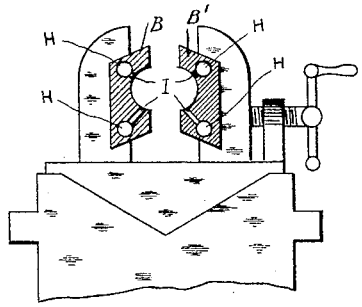
WITNESSES
H. B. Emery.
H. B. Lemp.
INVENTOR
H. Lemp

UNITED STATES PATENT OFFICE.

HERMANN LEMP, OF LYNN, MASSACHUSETTS, ASSIGNOR TO THE THOMSON ELECTRIC WELDING COMPANY, OF MAINE.

ART OF ELECTRIC WELDING.

SPECIFICATION forming part of Letters Patent No. 458,176, dated August 25, 1891.

Application filed May 31, 1890. Serial No. 353,809. (No model.)

*To all whom it may concern:*

Be it known that I, HERMANN LEMP, of Lynn, in the county of Essex and State of Massachusetts, have invented a new and useful Improvement in the Art of Electric Welding, of which the following, taken in connection with the accompanying drawings, is a specification.

My present invention relates to improvements in the art of electric welding and working of metals.

Prior to my invention several disadvantages have arisen in the use of electric currents of great volume in the practice of the art of electric welding, brazing, forging, shaping, &c., in which metal pieces are clamped or connected with conducting-blocks for the passage through them of such heavy currents as will heat them to the required degree. These disadvantages are: In continuous work the blocks or clamps become heated, and this makes a greater resistance at their contact with the metal pieces or bars which they hold in place. The surfaces of contact of the clamps, blocks, or jaws with the pieces become gradually burned or oxidized, so as to scale and become partially non-conducting. This is due to air contact when the parts are heated by the conveyance of current through the heated contact-surfaces.

It is a disadvantage also to be compelled to clean or brighten the surfaces of the work or pieces subjected to the action of the machine for welding, particularly as in the case of iron or steel a coating or scale generally exists which is difficult to remove thoroughly, and the removal of which even partially adds considerably to the cost of the welding or other operation.

There is the further disadvantage that in case of unequal clamping or clamping of the pieces that are not bright or clean an irregular distribution of the heating effect of the current may ensue, such as to disturb the equality of the heating of the piece or pieces to be operated upon, it being desirable to localize to the most complete extent the heating action to that part of the piece or pieces between or outside of the clamping-jaws. This cannot be done if the contacts of the jaws or blocks with the pieces are poor or imperfect or unequally conducting relatively, for heat would accumulate where the current passed in densest amount, and this would interfere with the regular distribution of the heating effect.

All these disadvantages are overcome by my present invention, which, though simple in character at first sight, will be found on study to involve actions peculiar to the case in hand—namely, that of the conveyance of heavy currents through clamping surfaces or blocks subject to heating and oxidation or already oxidized.

My invention consists in covering the conducting blocks, clamps, or clamping-surfaces, particularly at their working parts, and also the work-pieces where clamped or connected, with a continuous layer or film of liquid, such as water, whereby the metal is protected from the air, and cannot, therefore, coat with scale from the oxygen of the air combining with the metal, and whereby the metal surfaces in contact and traversed by exceedingly heavy current are cooled, so as to preserve their normal conducting power without increase thereof, and, further, whereby the contact obtained is virtually improved or made better by the inserting of capillary films of the liquid between the surfaces almost in contact or separated only by microscopic spaces. The action in this latter case is apparently one of conduction as well as electrolytic improvement due to electrolytic removal of films of oxide between the surfaces.

I find in actual practice with my invention that, notwithstanding the fact that the work-pieces be coated with scale, such scale forms but a slight barrier to the passage of current when such pieces are clamped, whereas prior to my invention it was necessary to remove the scale in order to secure continuously-good work. I attribute the effect so discovered to the action of the current in breaking down the scale electrolytically in the presence of the water-films.

I am aware that it is not unusual to apply water to parts of machines, such as bearings liable to heat, and that a water-circulation, internally or externally applied, is effective in keeping down temperature; but it will be seen that the mere provision of a water-circulation, external or internal, to the clamps or blocks is insufficient as securing the objects of my invention, as it is necessary that the liquid be delivered in such a way as to fill up or insert itself into the capillary channels between the work and the block or clamp surfaces, besides coating those surfaces so as to effectually exclude the air.

I do not limit myself to the devices shown in carrying out my invention. Any means by which liquid is applied to the contact-surfaces of conducting blocks or clamps will be sufficient, though perhaps not quite so effective as those hereinafter described.

In the accompanying drawings, Figure 1 is a plan view of the clamping devices of an electric-welding machine for joining flat bars. Fig. 2 illustrates a simple method of applying my invention. Figs. 3, 4, and 5 show more desirable methods. Figs. 6, 7, and 8 represent welding-clamps of various designs having my invention applied to them.

In order to lessen the parts and the trouble of construction for the practice of my invention, I prefer to take advantage of an invention of Professor Elihu Thomson for the cooling of electric-welding clamps by means of passages for the circulation of a cooling-fluid, which invention is a part of the Patent, No. 347,142, granted to him August 10, 1886.

In Fig. 1, B and B' represent the conducting-clamps carrying heating-current to the pieces of metal to be operated upon. C and C' are bars in position to be welded. A and A' are tightening devices for holding the bars against the copper conducting-blocks. The dotted lines indicate channels or passages for conveying water or other fluid through the clamps to keep them cool, as described in the above-mentioned patent. I drill a hole downward into these passages to obtain a supply of the cooling-fluid for use on the clamp-surfaces.

Fig. 2 illustrates in perspective a simple method of applying my invention to electric-welding clamps having the above-mentioned internal arrangement of passages for the conveyance of fluid. A short tube with nozzle attached is connected by suitable holes with the fluid-conveying passages and so arranged as to discharge a fine stream or spray onto the face of the clamps or conductors for receiving the pieces. The work-pieces are removed to show to better advantage the application of the fluid to the conducting-surfaces of the clamping devices.

In practice I prefer to combine the sprinkling or spraying device with the block in some such manner as is shown in Figs. 3, 4, and 5. In Fig. 3 a hole of suitable size is drilled into the side of the conducting-block B near the contact-face. From the contact-surfaces several small holes are drilled near the top, leading down into the large one. Across the upper part of the face a strip of brass D is placed, being soldered around all of its edges except the lower one, so that the fluid entering the large passage may, after passing up through the smaller ones, strike the plate and be thrown downward in a thin sheet over the contact-face of the block, as shown. Fig. 4 shows an arrangement in which small holes are drilled in the face of the block leading into the large passage; or shallow grooves may be made in the face of the clamp and these connected by small holes with the larger passages. In Fig. 5 a flat nozzle K is connected by a short tube to the large passage, by means of which a sheet of water is thrown downward, as shown, over the conducting-block in such a manner as to accomplish the desired result. In all of these constructions a suitable connection is provided to take the fluid from the main passages, as referred to in connection with and shown in Figs. 1 and 2.

Fig. 6 is a vertical end section of a V-shaped clamp for holding rods, pipes, bars, &c. In such clamps I prefer to drill longitudinal passages at the angle of the V, as at F. At the angle of the inner surfaces of the clamp and at suitable intervals in the length small holes, as E, are drilled leading down into the large passage. In order to force the water up onto the inner sides of the clamp for the purpose set forth, I provide a small flat strip of brass G, which is placed over the holes and secured by suitable means between them.

In Fig. 7 is illustrated a clamping device for holding special work. The conducting-blocks B B' have holes H H H H drilled longitudinally, and smaller holes I, leading from these to the clamp-surfaces.

Fig. 8 shows partly in section a welding-clamp provided with pipes and passages for circulation of fluid, and suitable small passages leading to the contact-surfaces of the clamp for the purposes described.

I do not limit myself to the form of clamps shown. It is obvious that my invention may be applied to any form of clamp used in electric welding and metal-working operations.

What I claim as my invention is—

1. That improvement in the art of electric welding, brazing, forging, shaping, &c., which consists in wetting the contact-surfaces of the conducting blocks or clamps in which the pieces to be operated upon are held with a fluid, such as water, at or about the time of the application of the heating electric currents, as and for the purposes described.

2. The method of improving electric contact, which consists in inserting films of liquid, such as water, between the clamping-surfaces and the surfaces or portions of the same clamped when such surfaces are not in actual metallic or firm contact.

3. The improved method of preservation of contact-surfaces of conducting clamping devices, which consists in covering said surfaces with a cooling-fluid previous to or during the welding or other metal-working operation.

4. In electric clamps having pipes or passages for the circulation of a fluid, the combination of suitable orifices to permit the flow of the fluid to the contact-surfaces of the clamps, for the purpose described.

5. In a transformer or induction-coil the secondary of which has internal pipes or passages for the circulation of a cooling medium, the combination of suitable openings to permit the flow of the medium to the surface or surfaces of the secondary.

In testimony whereof I have signed my name to this specification, in the presence of two subscribing witnesses, on this 20th day of May, A. D. 1890.

HERMANN LEMP.

Witnesses:
H. PERCY MAXIM,
HENRY N. SWEET.